United States Patent
Uchida et al.

(10) Patent No.: US 7,227,655 B1
(45) Date of Patent: Jun. 5, 2007

(54) UTILIZING OTHERWISE UNUSED SPACE ON COVER OR PARTITION SHEETS

(75) Inventors: Yuki Uchida, Wayne, NJ (US); Toshihiro Kudara, Riveredge, NJ (US); Hisashi Ishijima, Fort Lee, NJ (US)

(73) Assignees: Ricoh Company, Ltd., Tokyo (JP); Ricoh Corporation, West Caldwell, NJ (US)

( * ) Notice: Subject to any disclaimer, the term of this patent is extended or adjusted under 35 U.S.C. 154(b) by 0 days.

(21) Appl. No.: 09/563,266

(22) Filed: May 1, 2000

(51) Int. Cl.
*G06F 15/00* (2006.01)
*G06K 1/00* (2006.01)
(52) U.S. Cl. .................. 358/1.15; 358/1.15; 705/14
(58) Field of Classification Search ............ 705/14, 705/26; 358/1.9, 1.13, 1.1, 1.11–1.18
See application file for complete search history.

(56) References Cited

U.S. PATENT DOCUMENTS

| | | | | |
|---|---|---|---|---|
| 5,513,254 A | * | 4/1996 | Markowitz | 379/100.17 |
| 5,642,205 A | * | 6/1997 | Kassmann | 358/468 |
| 5,907,830 A | | 5/1999 | Engel et al. | 705/14 |
| 5,909,673 A | * | 6/1999 | Gregory | 705/45 |
| 5,926,795 A | | 7/1999 | Williams | 705/14 |
| 6,075,971 A | * | 6/2000 | Williams et al. | 725/23 |
| 6,118,546 A | * | 9/2000 | Sanchez et al. | 358/1.6 |
| 6,243,172 B1 | * | 6/2001 | Gauthier et al. | 358/1.18 |
| 6,313,921 B1 | * | 11/2001 | Kadowaki | 358/1.15 |
| 6,336,098 B1 | * | 1/2002 | Fortenberry et al. | 705/14 |
| 6,615,183 B1 | * | 9/2003 | Kolls | 705/26 |
| 2002/0178051 A1 | * | 11/2002 | Golden et al. | 705/14 |

FOREIGN PATENT DOCUMENTS

JP 966649 3/1997

* cited by examiner

*Primary Examiner*—Douglas Q. Tran
*Assistant Examiner*—Thierry L. Pham
(74) *Attorney, Agent, or Firm*—Cooper & Dunham LLP

(57) ABSTRACT

A system and method for utilizing otherwise unused space on cover or partition sheets printed in response to a print command, which sheets otherwise typically become waste paper, by printing on such sheets additional information not directly related to the print job but of interest to the user, such as coupons, or other promotional material, or other information such as lottery material.

16 Claims, 7 Drawing Sheets

UTILIZING OTHERWISE UNUSED SPACE ON COVER OR PARTITION SHEETS

FIELD

This patent specification is in the field of using printers or other image forming devices that print a sheet such as a cover or partition sheet for purposes such as separating print jobs from the same or different users or identifying print jobs and/or users.

BACKGROUND

Many types of image forming devices print sheets that are in addition to the normal print jobs. For example, a network printer can be arranged to automatically print a cover or partition sheets that contain information such as the identity of the print job, the time, the name of the user who sent the print job, etc. Similar arrangement can be set up for printers that are not shared, or for other image forming devices, such as multi-function office machines, copiers, fax machines, etc. Such additional sheets typically become waste paper once they have served their immediate purpose, such as helping a user find a particular print job or other image forming job.

SUMMARY

One embodiment disclosed herein uses the such cover or partition sheets to print coupons or other information that is not directly related to the print job associated with the cover or partition sheet but can be useful to the user in other ways.

In an embodiment that illustrates the principles disclosed in this patent specification, e-commerce entities provide coupon information related to goods or services they promote. For example, an office supplies company such as Staples may be interested in having coupons for a discount on a particular item printed on the cover or partition sheet of a user's print job. In accordance with a business arrangement with an entity such as a service center, for example a home page source such as an office equipment manufacturer, the e-commerce entity supplies coupon information to a database operated by or for the home page provider. Users at user stations such as personal computers that have either local area network (LAN) access to printers or direct access to individual printers, can request coupon information through an Internet connection with the home page source. For example, the request can be made by clicking through a menu on the home page or a link through the home page. In response, the service center downloads selected coupon information over the Internet to the user station, and the user station stores some or all of this information in memory at the local station, e.g., in the PC memory of a user, or at a server connected to the user's LAN. Provided that such coupon information has been already stored at the user's station, when a user issues a normal print command to print a print job, for example a Word document, and provided the normal response to such a print command is to print both the print job and a separate cover or partition sheet, the user station automatically accesses the locally stored coupon information, merges it with the normal cover or partition sheet information, and prints a new kind of a cover or partition sheet. The new kind of print includes the typical cover sheet information that is related to the print job, such as the time and date, some identification of the user who sent the print command and/or of the print job, but also includes additional information that is not directly related to the particular print job, e.g., includes a coupon from or for an e-commerce entity.

Other systems for electronic coupon distribution have been proposed, for example in U.S. Pat. Nos. 5,907,830, 5,909,673, and 5,926,795, the disclosures of which are hereby incorporated by reference as examples of state-of-the art technology. However, none of them propose the system or method disclosed and claimed in this patent specification.

DETAILED DESCRIPTION OF PREFERRED EMBODIMENTS

Figure 1:
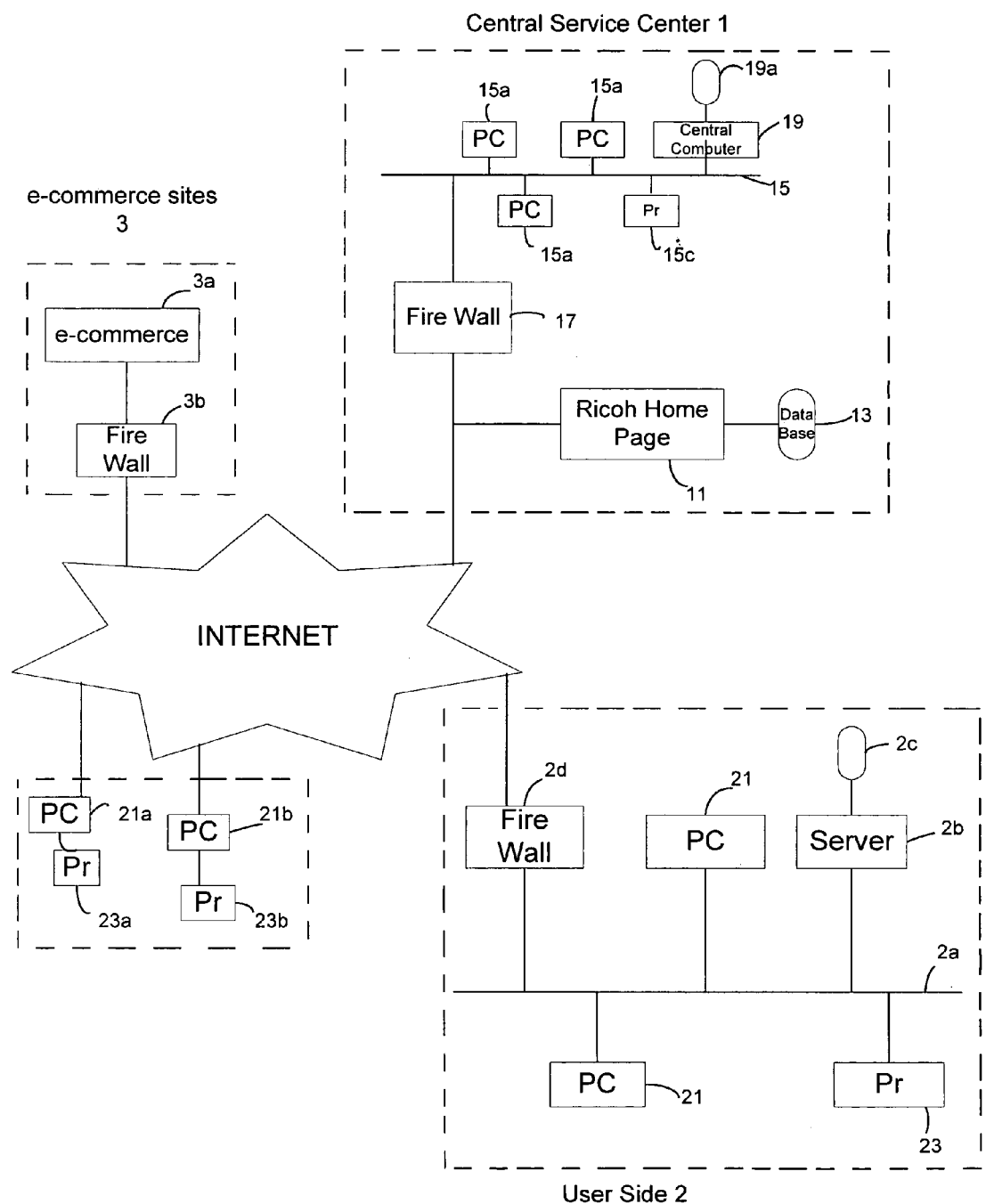
FIG. 1 illustrates the overall arrangement of a system according to a preferred embodiment.

Referring to FIG. 1, a preferred embodiment is discussed in which information unrelated to a print request is printed on a cover or partition sheet that is normally printed for purposes such as identifying the print job, the person who sent the print job, etc., but it should be clear that the principles outlined below are applicable to other image forming devices or other arrangements involving users and e-commerce entities.

In FIG. 1, when a user at a station such as personal computer (PC) 21 transmits a print request, a printer 23 prints not only the print job the user specifically requested but also additional information, typically on an additional sheet that can be called a cover sheet or a partition sheet. This additional information can typically include an identification of the user, the time and date, a file name or directory, etc. Such additional pages frequently are automatically printed when the user is a part of a network that includes other users, such as the network 2a illustrated at user side 2 in FIG. 1, but there can be occasions when even an printer that is not shared is set up to automatically print such additional sheets. In the example of FIG. 1, the network includes a server 2b having a database 2c, and a fire wall 2d through which the network is connected to the Internet, thereby allowing connection thereto for several individual users, each at a respective PC 21. While the Internet is the communication medium in this embodiment, it should be apparent that other large-scale networks can be used instead of, or in addition to, the Internet.

Through the Internet, the user side 2 can communicate with a central service center 1 and e-commerce sites 3. Central service center 1 has a home page source 11 and a database 13. In this example, the home page 11 and database 13 are operated by a printer manufacturer, but in other embodiments other entities can provide similar functionality. Service center 1 further includes a local area network (LAN) 15 and stations connected thereto such as PC's 15a, a central computer 19 and a database 19a connected thereto, as well as a printer 15c, with network 15 being connected to the Internet through a fire wall 17. E-commerce sites 3 also are connected to the Internet through a fire wall. While only one e-commerce site 3a and its fire wall 3b are illustrated in FIG. 1, it should be understood that typically multiple e-commerce sites would be included, with at least some of them having respective fire walls. Also connected to the Internet are individual PC users, such as 21a and 21b, connected to respective individual printers 23a and 23b.

Figure 2:
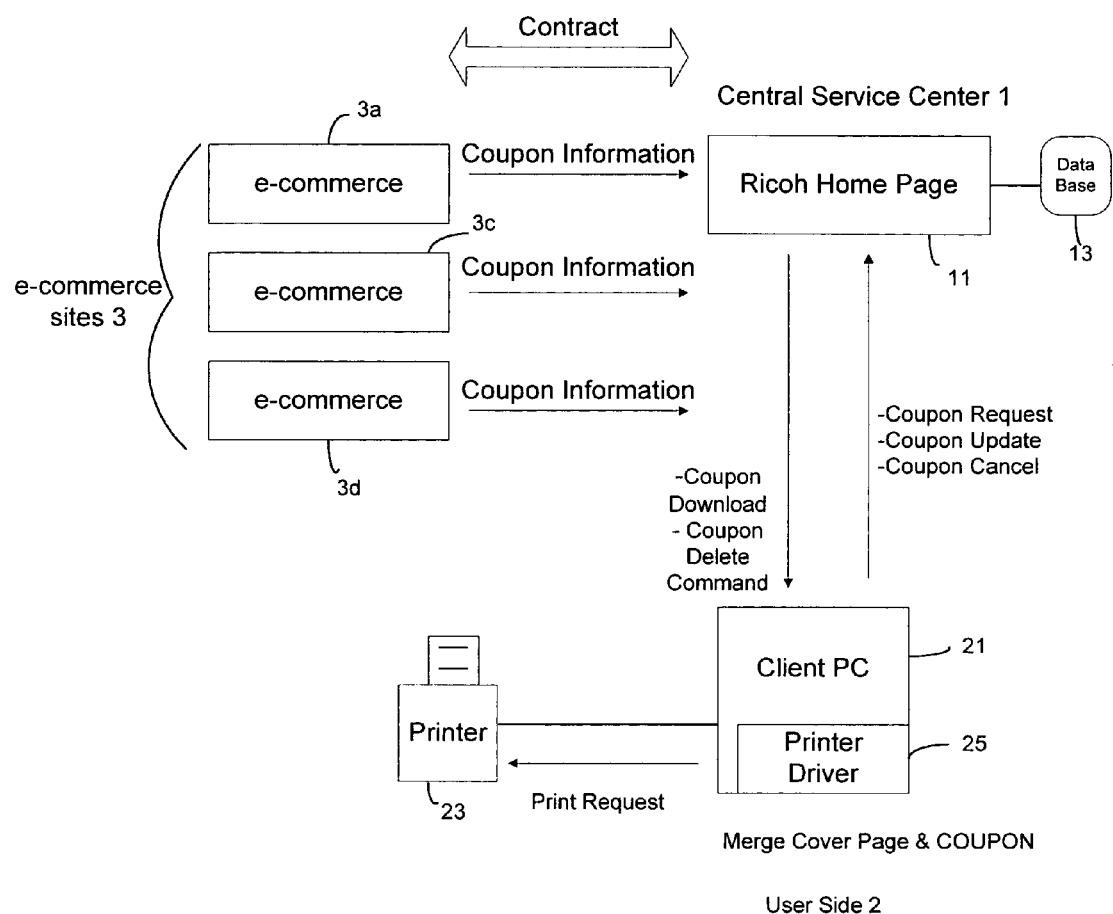
FIG. 2 illustrates exchange of information between entities included in the FIG. 1 arrangement.

Referring to FIG. 2, an entity that provides home page 11 has arrangements with entities that provide coupons. The arrangements can be directly between the entity providing home page 11 and e-commerce entities such as 3a, 3c and 3d, or can be through intermediaries (not illustrated in FIG. 1 or FIG. 2). Once appropriate commercial arrangements have been made, the e-commerce entities transmit to the home page source, directly or through other entities, coupon information that is ultimately stored in database 13, and can be updated from time to time as agreed according to the commercial arrangements. A PC 21 can access home page 11 and request coupon transmissions from the home page screen, as described below. One or more coupons can be transmitted from database 13 to a user PC such as 21, upon a user request or otherwise. For example, the user at 21 can request a specific coupon by clicking at an appropriate notation in the web page screen. Upon such a click, the user's PC 21 transmits the request to home page source 11, which then downloads the coupon information from database 13 to the user's PC 21. The user at 21 can similarly request the coupon information to be updated, or canceled, and the coupon information sent to and stored at the user's PC 21 can be updated or deleted based on data transmitted thereto from home page source 11.

At the user's PC 21, a printer driver 25 has merge software that merges the normal data that would be printed on a cover or partition sheet with the coupon information, and sends the merged data to printer 23 for printing a cover or partition sheet with both the normal information printed thereon and coupon information.

Figure 3:
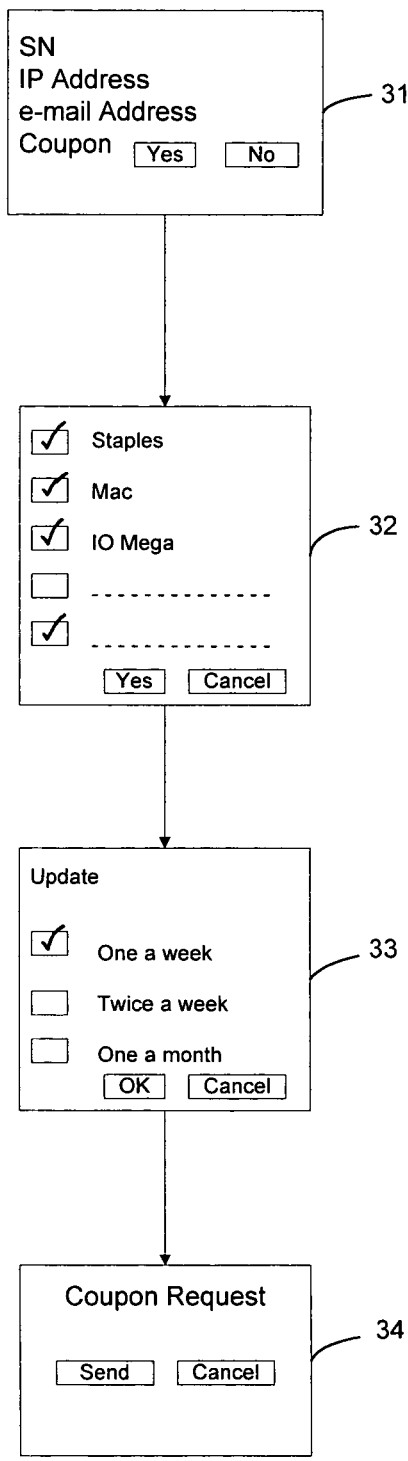
FIG. 3 illustrates a coupon request screen.

Referring to FIG. 3, preferred steps for making a coupon request include providing some user identification at step 31, for example on a screen form sent to a user at a PC 21 over the Internet from home page source 11. The user ID can be information such as one or more of a serial number of some other identification of the PC, an e-mail address, a name, or some other identification. Alternatively, such information could be provided without direct user input, for example through the use of "cookies" previously stored in the user's PC 21. In response to receiving a user ID, at step 32 home page source 11 sends for display on the user's screen a coupon request form for the user to click on one or more sources of coupons the user would like to receive. Upon confirmation by the user at step 32, such as clicking "yes," or without express confirmation in an alternate embodiment, the home page source 11 can send at step 33 for display at the user's PC another form on which the user can click information as to the desired frequency of updating the coupon information, and the user can confirm the choice by clicking "OK" or can cancel. At step 34, the user receives another form on which clicking at "send" send the coupon request to home page source 11 and clicking on "cancel" cancels the coupon request. Service center 1 receives the coupon request information from the user's PC 21 over the Internet and, upon authorization from central computer 19, database 13 downloads the coupon information to the user's PC 21 through the Internet connection.

Figure 4:
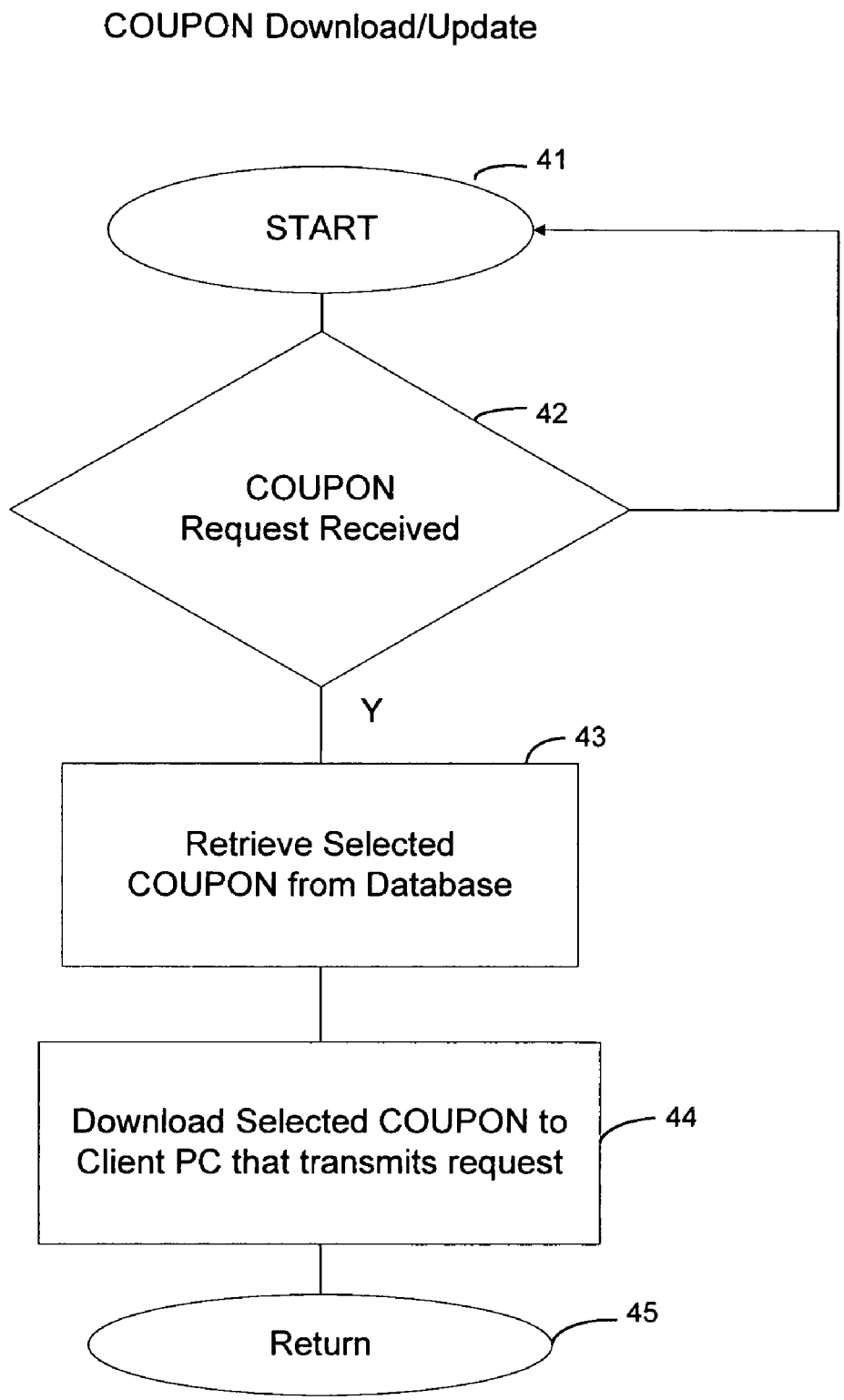
FIG. 4 is a flowchart illustrating a coupon download/update process.

Referring to FIG. 4, the process of downloading coupon information from service center 1 to the user's PC 21 starts at step 41 and at step 42 central computer 19 checks for coupon requests. If no coupon requests are pending, the process loops back to step 41, and this continues until step 42 determines that a coupon request from a PC 21 is pending. Upon a "yes" answer at step 42, the process retrieves the appropriate coupon information from database 13, and downloads it at step 44 to the requesting PC 21 through the Internet connection. Step 45 returns the process to the start step 41.

Figure 5:
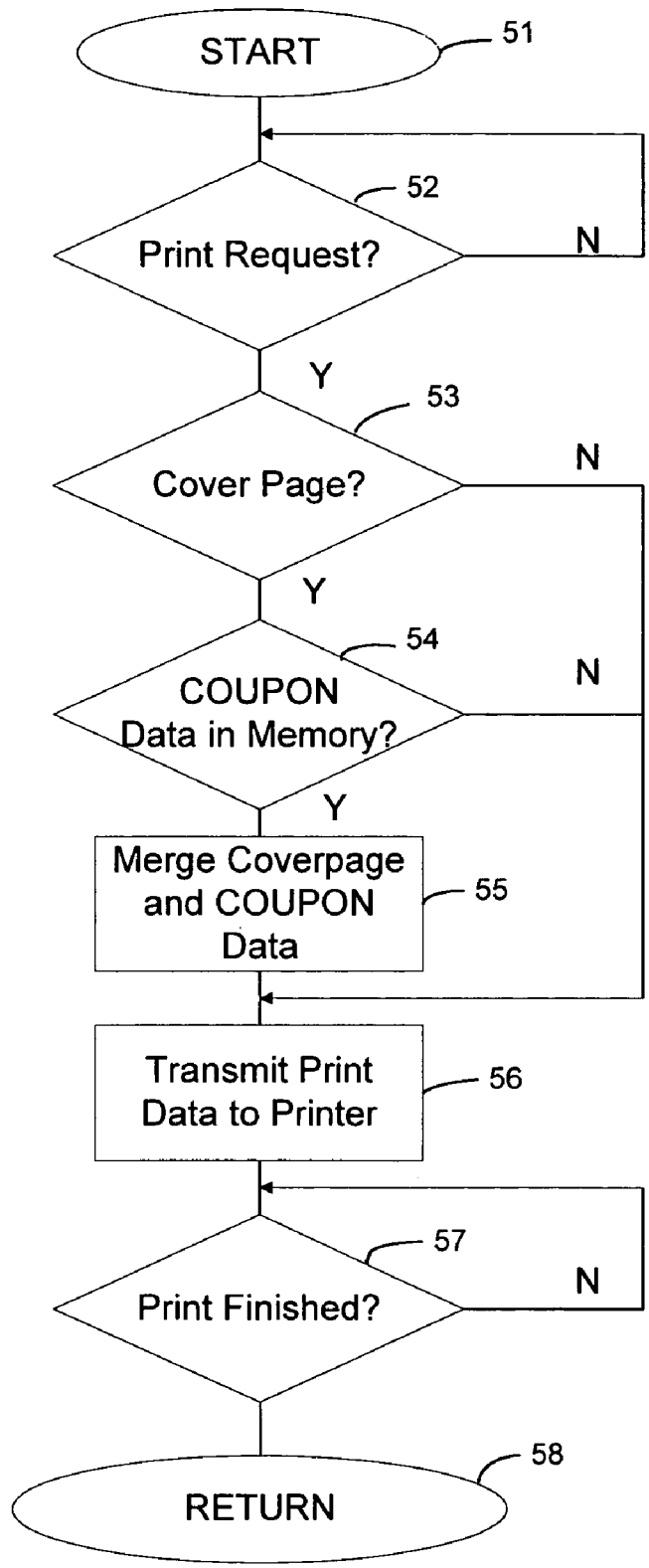
FIG. 5 is a flowchart illustrating a coupon printing process.

Referring to FIG. 5, the process of printing the coupon information at the user's PC 21 and printer 23. The process starts at step 51, checks at step 52 if the user's PC 21 has issued a request for a print job and loops back to step 51 if no printing has been requested. Upon detecting a print job request at step 52, the process checks at step 53 if a cover or partition page should be printed and, if the answer is "yes," checks at step 54 if there is coupon data in memory at PC 21. If the answer at step 54 also is "yes," the process merges the usual cover or partition sheet date with the appropriate coupon data, and at step 56 transmits to printer 23 the print data for all three of the print job, the normal cover or partition page, and the coupon. The process keeps checking at step 57 if printing has been completed, and ends at step 58 upon the end of printing and return to step 51. If the answer at step 53 is "no," i.e., no cover or partition page is to be printed, the process goes directly to step 56 to transmit for printing only the print job. Similarly, if the answer at step 54 is "no," i.e., there is no coupon data at PC 21, the process goes directly to step 56, to transmit for printing only the print job and the normal cover sheet or partition sheet data.

Figure 6:
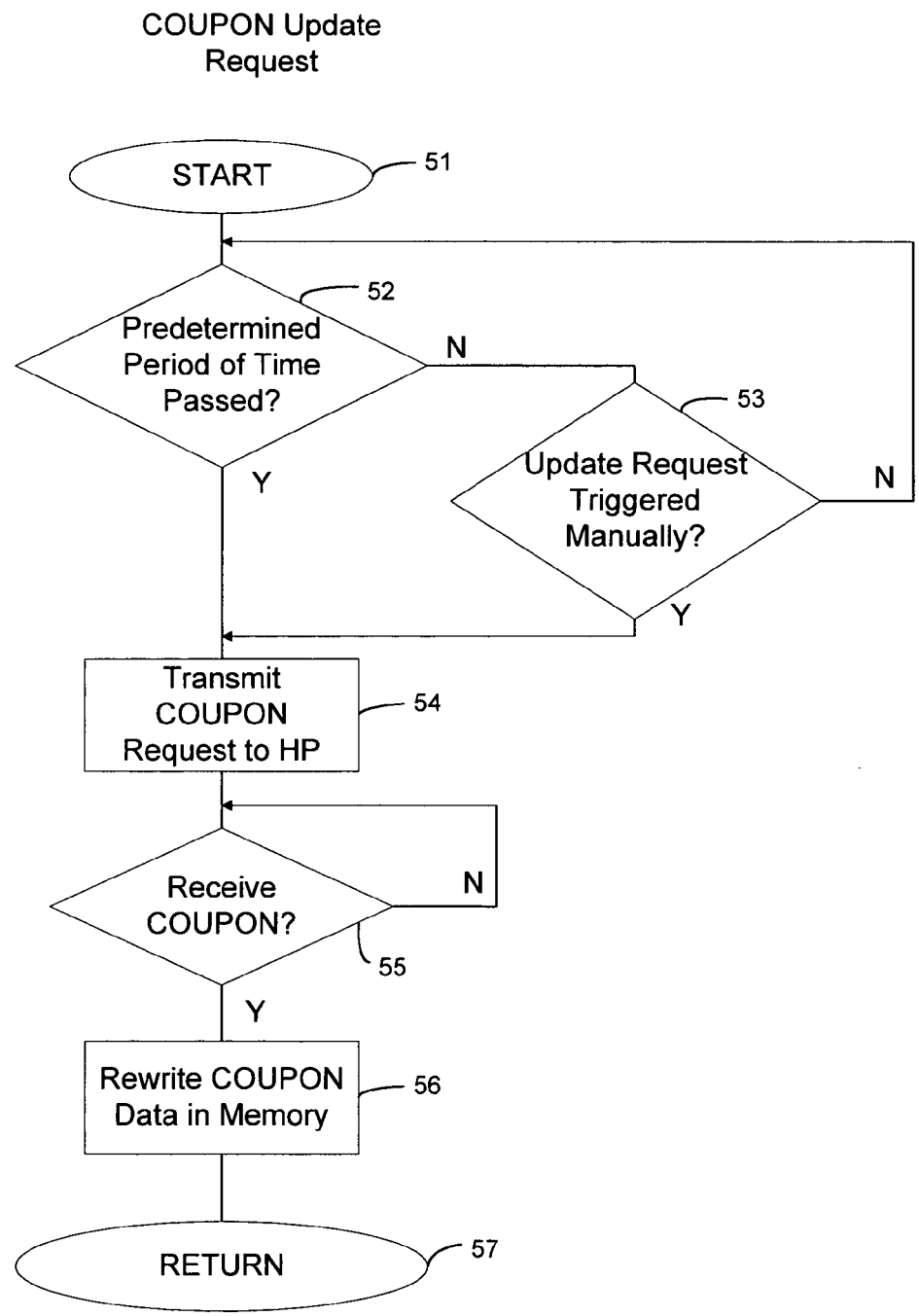
FIG. 6 is a flowchart illustrating a process involving a coupon update request.

Referring to FIG. 6, the process carried out by a user PC 21 to updating a coupon data at appropriate time intervals starts at step 51 and at step 52 the process checks whether an appropriate preset time interval for the relevant PC 21 has passed. If the answer is "no," the process checks at step 53 whether a manual or other override should command updating even if the preset time interval has not passed and, if the answer is "no," returns to step 51. If the answer at step 52 or at step 53 is "yes," the process at step 54 transmits a coupon request to the home page source 11, and checks at step 55 is a coupon request has been received at PC 21 from the home page source 11 over the Internet connection. If the answer at step 55 is "no," the process loops back to step 55, until a "yes" answer leads to step 56, at which PC 21 writes or rewrites the newly received coupon data in its memory, and proceeds to step 57, which returns the process to step 51.

Figure 7:
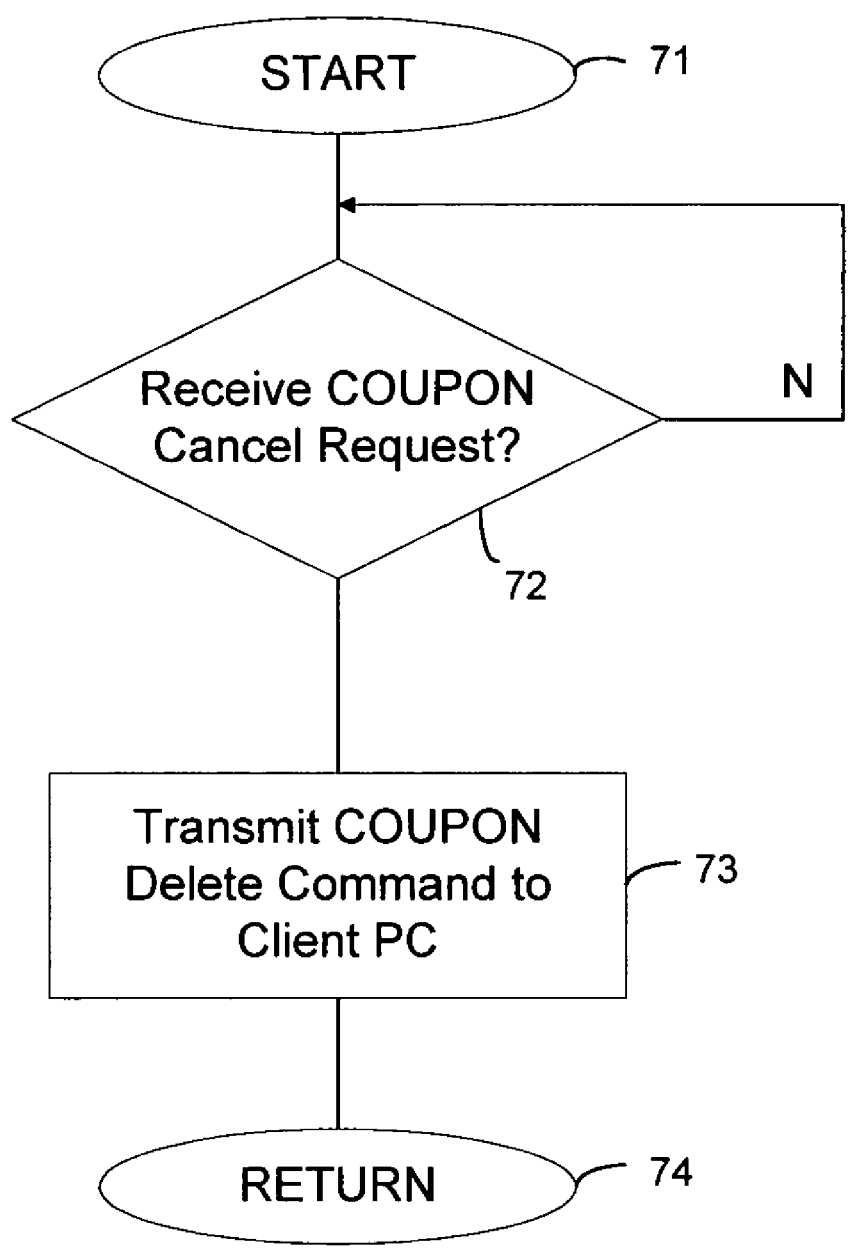
FIG. 7 is a flowchart illustrating a coupon canceling process.

Referring to FIG. 7, a user can cancel a coupon request previously made, and can clear PC 21 of coupon data by sending an appropriate request to service center 1 though the Internet connection. The process carried out at service center 1 starts at step at step 71 and checks at step 72 whether a request for canceling coupon information has been received from a PC 21. If the answer is "no," the process loops back to step 71. Upon a "yes" answer at step 72, the process transmits a coupon delete command to the appropriate PC 21 over the Internet connection, and at step 74 causes a return to step 71. In response to the coupon delete command received at a PC 21 as a result of step 73, the PC 21 deletes the software commands that had been stored therein to cause the transmission of coupon updating requests to service center 1.

In the preferred embodiments disclosed above, the additional information printed on the cover or partition sheet is coupons, but it can be other information that is in addition to the normal information printed on such an additional sheet. As a non-limiting example, the additional information can be lottery information that can be downloaded to a user's PC with or instead of the coupon information discussed above, and stored at the user's PC 21. For example, a set of random numbers, or software for generating such a set of random numbers, can be downloaded from service center 1 to a user's PC 21 together with a lottery number. The lottery number can be printed at printer 23 as described above for the coupon information, and the set of random number downloaded from service center 1, or a set of locally generated random numbers, can be printed on the same sheet or on cover or partition sheets for other print jobs. As other examples, educational material, or promotional material, or company announcements, or some other information can be printed on the cover or partition sheets, or on other sheets that have utilizable space, instead of or in addition to the types of information discussed above.

The invention claimed is:

1. A method for responding to a print request from a user station for printing a print job by printing one or more sheets constituting the requested print job and printing an additional sheet constituted by a cover sheet or a partition sheet, containing both information related to the print job and additional information that is directed to the user but is not specific to the print job, comprising:
    storing in memory at an user station said additional information that is directed to the user but is not specific to the print job;
    in response to a request from the user to print a print job, automatically checking said memory at said user station whether said additional information that is directed to the user but is not specific to the print job is stored in said memory at said user station;
    if said checking indicates that said additional information is stored in said memory at said user station, merging the additional information with information related to the print job to produce merged information, and printing the merged information on said additional sheet in addition to printing said one or more sheets constituting the requested print job; and
    if said checking indicates that said additional information is not stored in said memory at said user station, printing the requested print job and printing on a cover or partition sheet only the information related to the print job; and
    automatically retrieving said additional information from said user station memory, without user knowledge of contents of said additional information, before the printing of the merged information,
    wherein said additional information is coupon information.

2. A method as in claim 1, further comprising providing a request for data related to said additional information from the user station, transmitting said request for data to a service center through the Internet and, in response, downloading the requested data into the memory at the user station, wherein the downloaded data comprises said additional information.

3. A method as in claim 1, further comprising selecting desired coupon information at the user station and transmitting selection information to the service center before said downloading.

4. A method as in claim 3, further comprising updating the additional information stored at the user station at selected intervals by updating information transmitted thereto over the Internet from the service center.

5. A method as in claim 4, wherein the additional information is updated in response to a manual request to update transmitted from the user station to the service center through the Internet.

6. A method as in claim 5, further comprising deleting said additional information from the user station in response to a coupon-canceling request by the user entered at the user station.

7. A method for printing e-commerce coupons at an otherwise unused space on a cover or partition sheet normally printed in response to a user's print job command, in addition to printing one or more sheets constituting the requested print job, comprising:
    providing coupon information related to goods or services of e-commerce entities;
    downloading selected coupon information over the Internet to a user station having printer access;
    storing selected downloaded coupon information in memory at the user station;
    in response to a print command at the user station, automatically checking said memory at said user station whether the coupon information is stored in said memory at said user station;
    if said checking indicates that the coupon information is stored in said memory at said user station, printing a print job specified by the print command and a cover or partition sheet separate from the sheets on which the print job is printed, wherein the information printed on the cover or partition sheet comprises (a) information related to the print job, and (b) a coupon based on the coupon information stored in memory at the user station, said coupon being different from the information related to the print job;
    if said checking indicates that the coupon information is not stored in said memory at said user station, printing the requested print job and printing on the cover or partition sheet only the information related to the print job; and
    automatically retrieving said additional information from said user station memory, without user knowledge of contents of said additional information, before the printing of the merged information.

8. A method as in claim 7, further comprising updating at selected times the selected coupon information stored in memory at the user station, on the basis of updating information transmitted to the user station over the Internet.

9. A method as in claim 8 in which said selected limes include both preselected times and a time corresponding to an update request manually entered at the user station.

10. A method as in claim 7 in which said printer access is provided through a local area network to which the user station is connected.

11. A method as in claim 7 in which at least a part of said selected downloaded coupon information is stored at a server connected to said local area network and is selectively provided to said user station for use in printing said coupons.

12. A method as in claim 7 in which said printer access is provided through a printer directly connected to the user station, without using a local area network for printer access.

13. A method as in claim 7, further comprising providing information related to individual e-commerce entities to a service center, storing the provided information in a database at the service center for use in said downloading of selected coupon information from the service center to user stations.

14. The method of claim 1 further comprising the step of retrieving the additional information from the memory at the user station, in response to the request from the user to print the print job.

15. The method of claim 7 further comprising the step of retrieving the coupon information from the memory at the user station, in response to the print command at the user station.

16. The method of claim 1, wherein if said automatic checking indicates that said additional information that is directed to the user but is not specific to the print job is stored in said memory at said user station, said additional sheet bearing said additional information is printed without user designation or selection of said additional information.

* * * * *